No. 824,374. PATENTED JUNE 26, 1906.
A. H. MUNSELL.
COLOR CHART OR SCALE.
APPLICATION FILED JUNE 5, 1905.

2 SHEETS—SHEET 1.

Witnesses
Albert H. Munsell, Inventor
by Chas. F. Perkins,
Attorney

No. 824,374. PATENTED JUNE 26, 1906.
A. H. MUNSELL.
COLOR CHART OR SCALE.
APPLICATION FILED JUNE 5, 1905.

2 SHEETS—SHEET 2.

Witnesses

Albert H. Munsell
Inventor
by Chas. F. Dennis
Attorney

UNITED STATES PATENT OFFICE.

ALBERT H. MUNSELL, OF BROOKLINE, MASSACHUSETTS.

COLOR CHART OR SCALE.

No. 824,374.  Specification of Letters Patent.  Patented June 26, 1906.

Application filed June 5, 1905. Serial No. 263,775.

*To all whom it may concern:*

Be it known that I, ALBERT H. MUNSELL, a citizen of the United States, residing at Brookline, in the county of Norfolk and State of Massachusetts, have invented new and useful Improvements in Color Charts or Scales, of which the following is a specification.

My invention consists of a system of charts in which all colors with their degrees of hue and their various degrees of strength and light found in pigments are displayed in a logical and convenient order and are expressed by symbols and upon which may be added and displayed the hues of newly-discovered pigments and their degrees of light and strength in the same order or sequence without disturbing the preëxisting arrangement.

The object of my invention is to provide a standard color scale or measure by means of which the three well-known constants or qualities of color—namely, hue, value or luminosity, and purity of chroma—may be expressed by signs or symbols for the purpose of readily communicating the idea of a given degree of each from one person to another without exhibiting a specimen thereof.

Figure 1:
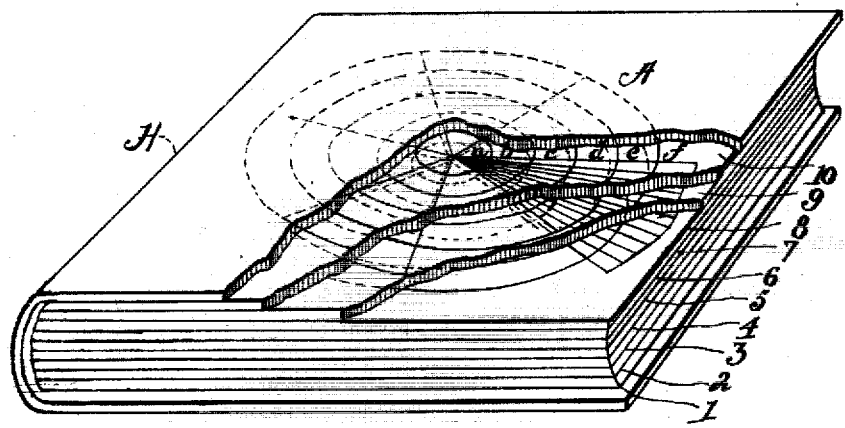
Figure 2:
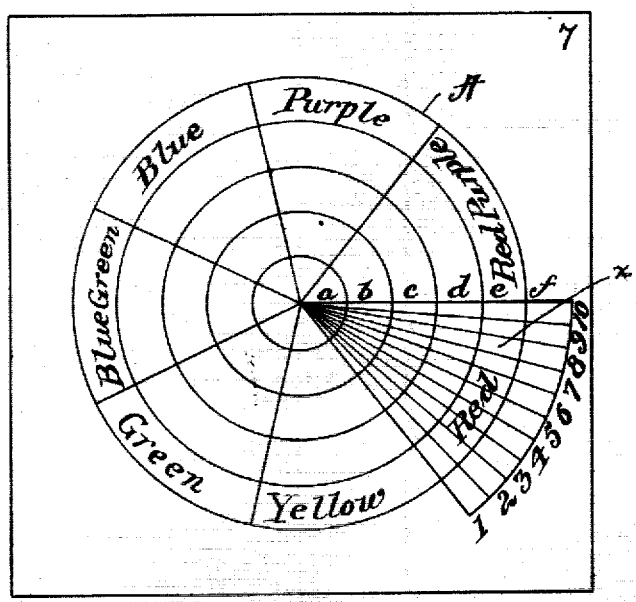
Figure 3:
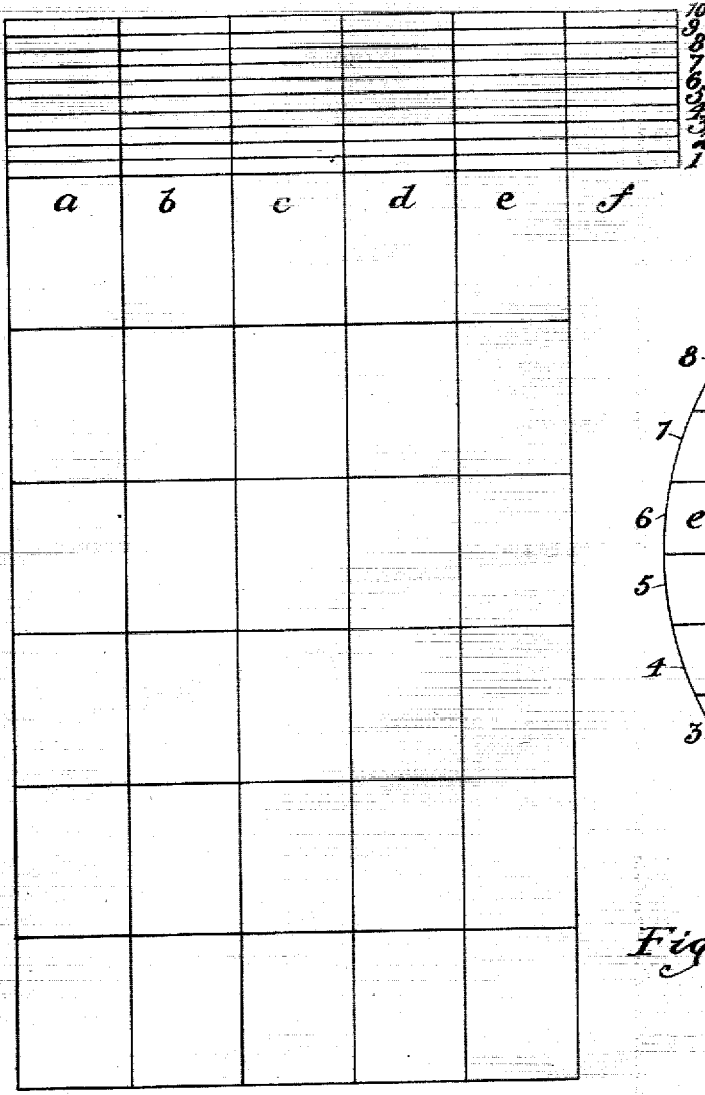
Figure 5:
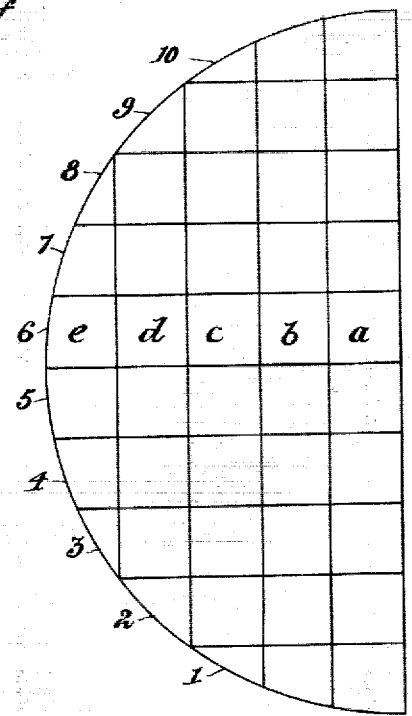
Figure 4:
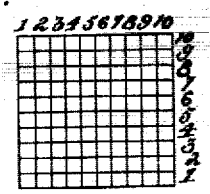

In the accompanying drawings, illustrating my invention, Figure 1 is a perspective view of a book of charts embodying my system. Fig. 2 is a plan view of one of the charts, as No. 7, displaying all the colors of the spectrum in a common degree of value and in different degrees of hue and chroma. Fig. 3 is a modification of the form of the chart shown in Fig. 2 and displaying the colors of the spectrum in a common degree of value and in various degrees of hue and chroma. Fig. 4 is one of my charts displaying various hues in a common degree of chroma and in various degrees of value. Fig. 5 is a chart displaying a common hue in different degrees of value and chroma.

The hue varies in chroma according to the amount of coloring-matter possessed, and it varies in value according to the amount of light which it reflects.

It may assist in understanding the order of arrangement of my charts to know that the idea is suggested by the form of a spherical solid subdivided through the equator and in parallel planes thereto, forming thin disks, one of which is illustrated by Fig. 2 and assumed to be located in the plane of the equator and displaying thereon a complete circle made by the mixture of the primary colors in the middle value—that is, midway between black and white, as determined by photometric measurement—it being assumed that pure white is located at the north pole and black at the south pole and that the charts displaying lighter values than that represented by Fig. 2 located at the equator correspond to the planes above the equator and are arranged in regular order, increasing in value by regular gradation from the equator to the north pole and that the charts displaying darker values represent the planes located below the equator and diminish in value in regular gradation from the equator to the south pole.

Fig. 2 represents a sheet of heavy paper, cardboard, or other suitable material on which are described concentric rings or bands of different hues, $a\ b\ c\ d\ e\ f$. Each band or ring is divided radially into sections of equal area, and on each of said sections is displayed one hue of the spectrum-circuit of the primary colors of the spectrum, as shown by the printed words thereon. The colors are arranged upon the band in the sequence produced by bringing the ends of a spectrum-band together and converting it into an annular ring. The outer band $e$ displays the spectrum colors in their greatest degree of chroma, as now found in pigments in use in the arts and industries. In the next smaller band $d$ the colors are weaker than those in the band $e$, and those in $c$ are weaker than those in $d$, and so on, diminishing in strength by uniform gradation until the color disappears or becomes neutral at the common center. The bands are so related to each other that all the divisions of a given color lie in the same sector, and thus in a given sector will be found a single color which is strongest in the outer band and gradually diminishes in strength from band to band until it disappears at the center, thus exhibiting all the degrees of chroma of that color which are known in pigments.

The novelty of my arrangement of color resides chiefly in establishing a basis for my system by displaying on one chart the colors of the spectrum in the middle value between white and black as determined by photometric instruments and then supplementing such chart with others displaying on each the colors of the spectrum in a common degree of value in uniform gradation from the chart of middle value through all the lighter values to white and oppositely through all the darker values to black.

I am not aware that in any previous attempts to produce color charts or scales this arrangement has ever been made. The development of this idea enables me to produce charts which display a given hue of color in various degrees of value and chroma progressing uniformly from pure white to black and from the strongest degree of chroma to the weakest. For example, assuming a spherical solid to be penetrated with coloring-matter so that when subdivided through the plane of the equator and in planes parallel thereto colored surfaces would be displayed like that described as represented in Fig. 2, and upon other charts of lighter and darker values corresponding to planes parallel thereto, as before described. Then if such solids were subdivided into hemispheres through the north and south pole and each hemisphere were subdivided radially at right angles to the equator the surface of each latter subdivision would display a given degree of hue varying in degree of value regularly from the north to the south pole and in degree of chroma regularly in a transverse direction thereto.

In Fig. 5 I have illustrated a chart corresponding to a plane through a hemisphere, as above described, the horizontal lines thereon indicating various degrees of value and the vertical lines various degrees of chroma.

I do not limit my invention to such form of chart as would result from the subdivisions of a spherical solid, as it is obvious that other forms would accomplish the same result with more or less convenience of arrangement. For instance, the charts may be rectangular in form, such as would be suggested by subdividing a cubic solid penetrated with coloring-matter after the same general idea as that described in reference to the spherical solid. For illustration, referring to Fig. 3, which represents a rectangular chart with the colors of the spectrum displayed thereon in their natural sequence, it may be assumed to represent a subdivision of a cubic solid cut through a horizontal plane midway between the top and bottom surfaces thereof and having displayed thereon the spectrum colors in a degree of value midway between black and white, as determined by photometric instruments, and that this forms the basic chart corresponding to the chart shown in Fig. 2. Let us then assume that the top surface of the cubic solid displays pure white and the bottom surface black and that charts are formed by subdivisions of the cubic solid cut through planes parallel to the plane on which Fig. 3 is subdivided and above the latter and that the surface of each subdivision displays the spectrum colors in the same order as Fig. 3, each having a common degree of value and displaying lighter values in uniform gradation between the chart illustrated by Fig. 3 and the top surface of the solid and assuming also that below the plane illustrated by Fig. 3 the solid is cut on parallel planes and that the subdivisions so formed display on their surfaces the colors of the spectrum in the same order as Fig. 3, each having a common degree of value and graded uniformly to black from the center to the lower surface. It is obvious that irregular solids may be subdivided upon the same general plan producing disks of various shapes and still displaying the colors after the order described and which is novel to my system. In order to produce the charts displaying colors of a common hue and varying in degrees of value and chroma, if the same were made by subdivisions of a cubic solid the same would be cut in planes at right angles to the subdivisions forming the charts which display the colors in a common value, as above described. It is also apparent that by subdividing the cubic solid diagonally, assuming it to be penetrated with coloring-matter, as above described, the effect displayed upon a given surface would be various degrees of each quality of color and progressing uniformly from one extreme to the other.

Referring to Fig. 2, section $f$ represents a stronger degree of red than that displayed in the band $e$. It stands alone, because red is found in pigments of greater strength or chroma than any other color, and the band to which red belongs in its greatest degree of chroma, as shown at $f$, therefore, cannot be completed on my chart until other colors of the same degree of chroma are discovered in pigments. The plan is to add to the chart, section by section, as the pigments are produced in the market, and to identify such additions by reference letters, numerals, or symbols, in accordance with the system of notation herein described—for instance, to indicate the next addition to "f" as "g." This illustrates my plan of adding to each color a section of greater strength to correspond to a newly-discovered pigment, so that a complete color scale or standard will be provided, containing all the hues and their various degrees of value and strength in use. The colors may be printed or painted upon the sheet of cardboard, or colored materials may be attached thereto for the purpose of displaying the colors.

The colors may be arranged upon the chart in the manner shown in Fig. 2; but other forms may be employed which are within the scope of my invention. In Fig. 3 I have shown one modification of the form of chart in which the sections of color are arranged in parallel bands instead of in the form of concentric rings. Referring to Fig. 3, the parallel bands, $a$, $b$, $c$, and $e$ display colors of the same value and in the same sequence as the order of the primary colors in the spectrum. The color is weaker in the band $d$ than in the band $e$, and gradually diminishes with each successive band, as indicated in Fig. 2. In the division "red," $f$ is a section representing the color of greater chroma than that represented in the band $e$ and corresponds to the section $f$ in Fig. 2 and illustrates the system of extending the chart to display new pigments, as hereinbefore described. Referring to Figs. 2 and 3, each color is divided throughout all its degrees of strength into ten degrees of hue. I do not limit my invention to this precise number of divisions; but it will suffice to illustrate my system. Each one of these degrees of hue is numbered consecutively. Many modifications of the manner of dividing the chart could be made and still embody the essential features of my invention, which are to display on each horizontal chart colors of the same value only, so that each chart may be developed by adding other sections displaying newly-discovered pigments, without changing the preexisting arrangement or disturbing the system of notation.

For convenience in use I prefer to arrange the charts in the order and manner shown in Fig. 1, in which are shown several charts bound together in a cover H. I have shown ten charts therein, assumed to be in form like that illustrated in Fig. 2, but displaying the colors in different degrees of value from white to black, the top chart being of the lightest value and the bottom one of the darkest, and numbered regularly from ten to one, the middle chart 5 displaying the colors in a middle value between white and black, each of those above displaying the colors in a lighter value and those below in a darker value.

The practical utility of my invention consists in affording to artists, merchants and their customers, and to educators means of communicating with each other by arbitrary signs or symbols their precise ideas of color. It is evident that when two persons are possessed of a series of my charts one may express to the other by means of the symbols employed thereon any hue with its value and chroma. I prefer to use the particular symbols shown, because they are based upon a simple and scientific plan of color measurement and may be extended as other colors are added without disturbing the preëxisting arrangement; but I do not limit my invention thereto, as it is obvious that other arbitrary signs or symbols may be employed.

In Fig. 4 I have shown a chart which displays the colors in their several values and in their greatest degree of chroma. It represents the charts in the order in which they are superimposed upon each other in Fig. 1. In the use of my charts a specimen of material whose color is to be expressed in signs or symbols is examined by means of a photometer. If it is "red," it is first compared with the specimens of red displayed in the chart, as shown in Fig. 1, until its equivalent in value is found. Assuming it to be of the same value as the specimen marked "6," the chart known as 6 in the series illustrated in Fig. 1 is referred to, and the specimen is then compared with the degrees of hue thereon for the purpose of matching the same as closely as the eye is capable of doing. The color value of a specimen can be determined without reference to the chart shown in Fig. 4 by employing a registering photometer and designating the charts so as to correspond with the system of notation of values in the photometer, and then by reference to the chart of that value the hue and degree of chroma of the specimen may be determined. The regular gradation of each from strongest to weakest value enables one to make a critical comparison of the specimen with the divisions by moving it over them and to judge with great accuracy of its identity with one of them. Having determined its identity, its degree of hue would be expressed by one of the numbers "1" to "10" and its chroma by one of the letters of the alphabet "a" to "f," so that if the color were red its value "7," as in Fig. 2, its hue "8," and its chroma "e," it would be expressed as "8R 7/e," as indicated in the space $x$ in said figure. By transmitting this formula to another in possession of duplicate charts for the purpose of ordering goods or for any other use which it may serve an accurate idea of the color is given. It is obvious that upon the discovery of a pigment of greater strength than those now in use it would take its place upon the chart in the same manner that section "f" is added in Figs. 2 and 3, and it would be lettered "g" if it should be "red," or if some other color shown in the figures of the drawings it would be lettered "f," and this would occur without in any manner disturbing the arrangement of the chart. I do not wish to have it understood that I have in the drawings illustrated the relative degrees of chroma of the different colors in a given value. An accurate chart of the relative degrees of the chromas of the several colors would be very irregular at its edge, and I have shown them as exhibited in the drawings simply to illustrate the essential features of my system.

Referring to Fig. 5, it is obvious that a series of charts each displaying one hue and various degrees of value and chroma can be provided with my system of notation, so that a specimen of color of a given degree of hue can be compared and measured upon the chart of that hue for the purpose of fixing its degree of value and chroma, and when determined the result can be expressed in the symbols displayed on such chart. The same principle of notation would also apply to charts corresponding to planes formed obliquely to the charts representing horizontal planes.

It will be seen that by this invention there is furnished a system of charts on each of which the colors are of a common level with reference to the value they possess or the degree of light which they reflect and extending through the whole range from white to black. This division of colors or arrangement of charts is purely arbitrary, and has for its object special utility in the industrial arts. For instance, if one desires to match a given color the value of the specimen that he desires to match can be readily determined by the use of a photometer, which having been ascertained the operator will know to just what level of values in the charts this specimen belongs. For example, if it should happen to be an exact middle value between black and white it would belong to the chart represented by the plane of the equator, that chart having already been measured photometrically and established at the middle value, as above stated. The operator then having determined that the specimen is of the same value as the chart at the equator, which may be called "fifty degrees" or designated in any other way, places the specimen upon the chart and by carefully moving it over it and comparing it with the various subdivisions of hue will be able to match the same with great precision as to the other two qualities of hue and chroma which are displayed. As the surface of the chart is subdivided into hues and degrees of strength and each of the subdivisions numbered or indicated by some symbol, when the operator finds the subdivision which exactly matches his specimen he is then able to communicate to another person possessing a similar chart by means of the symbol an exact idea of the degree of hue, strength, and value possessed by his specimen, and thereby to have it duplicated. It will be seen that in this way persons possessing duplicate charts who are located in different parts of the country or the world may be able to describe to each other in writing their precise ideas concerning colors.

What I claim, and desire to secure by Letters Patent, is—

1. A color chart upon which are displayed the colors of the spectrum, all of said colors having the same degree of value or luminosity.

2. A system of charts upon one of which are displayed the colors of the spectrum all of said colors exhibiting the middle degree of value between white and black, and upon each of the others of which are displayed the colors of the spectrum in a common degree of value, and which together exhibit a uniform gradation of value from said middle degree of value to pure white.

3. A system of charts upon one of which are displayed the colors of the spectrum all of said colors exhibiting the middle degree of value between white and black, and upon each of the others of which are displayed the colors of the spectrum in a common degree of value and which together exhibit a uniform gradation of value from said middle degree of value to black.

4. A system of charts upon one of which are displayed the colors of the spectrum, all of said colors exhibiting the middle degree of value between white and black, and upon each of the others of which are displayed the colors of the spectrum in a common degree of value and which together exhibit a uniform gradation of value from white to black.

5. A system of charts upon one of which are displayed the colors of the spectrum all of said colors exhibiting the middle degree of value between white and black, and upon each of the others of which are displayed the colors of the spectrum in a common degree of value, and which together exhibit a uniform gradation of value from white to black, and the several degrees of hue, value and chroma being indicated respectively by symbols displayed thereon and constituting a system of notation for said charts.

6. A color chart consisting of a circle divided into sectors of equal area, each sector having one of the colors of the spectrum described thereon, all of said colors being of the same value and each color being displayed in its greatest degree of chroma at the circumference of the circle and graded regularly in chroma toward the center to a neutral gray.

7. A color chart consisting of a circle divided into sectors of equal area, each sector having one of the colors of the spectrum described thereon, all of said colors being of the same value and each color being displayed in its greatest degree of chroma at the circumference of the circle and graded regularly in chroma toward the center to a neutral gray, each of said colors being divided into its degrees of hue by radial lines and into degrees of chroma by concentric rings.

8. A pack or series of color charts bound together, each having thereon colors of the same value but of various hues and degrees of strength, each chart exhibiting a different degree of value from the others, the chart at the center of the pack bearing a medium value, the charts on one side thereof being of a lighter value, and those upon the other being of darker value.

9. A pack or series of color charts bound together, each having thereon colors of the same value but of various degrees of hue and degrees of strength, each chart having a different color value from the others, the chart at the center of the pack having a medium value, the charts on one side thereof being of lighter and those upon the other being of darker value, and the charts of lighter values graded regularly toward white from the center to the surface, and those of darker values graded regularly toward black from the center to the opposite surface.

10. A pack or series of color charts bound together, each having thereon colors of the same value but of various degrees of hue and degrees of strength, each chart having a different color value from the others, the chart at the center of the pack having a medium value, the charts on one side thereof being of lighter and those upon the other being of darker value, and the charts of lighter values graded regularly toward white from the center to the surface, and those of darker values graded regularly toward black from the center to the opposite surface, all of said charts and the divisions and degrees thereon bearing symbols to identify and express the same.

11. A color chart having displayed thereon one of the colors of the spectrum in a common degree of hue and in various degrees of value and chroma, the middle degree of value between white and black being located midway of the chart and the lighter and darker values being arranged on opposite sides of said middle value and graded uniformly in value thereon.

In testimony whereof I have hereunto set my hand, in presence of two subscribing witnesses, this 19th day of May, 1905.

ALBERT H. MUNSELL.

Witnesses:
 CHAS. F. PERKINS,
 JOSEPH J. O'CONNELL.